United States Patent [19]

Baldwin et al.

[11] Patent Number: 5,042,265
[45] Date of Patent: Aug. 27, 1991

[54] CONTROLLING HVAC TEST FUNCTIONS

[75] Inventors: Joe M. Baldwin; Richard A. Bishop, both of Clarksville, Tenn.

[73] Assignee: American Standard Inc., New York, N.Y.

[21] Appl. No.: 554,302

[22] Filed: Jul. 16, 1990

[51] Int. Cl.$^5$ .............................................. G01M 1/00
[52] U.S. Cl. ...................................... 62/127; 62/157; 236/94
[58] Field of Search ................. 62/125, 126, 127, 129, 62/130, 160, 157, 158; 236/94; 165/11.1

[56] References Cited

U.S. PATENT DOCUMENTS

| | | | |
|---|---|---|---|
| 4,289,272 | 9/1981 | Murase et al. | 62/160 X |
| 4,419,866 | 12/1983 | Howland | 62/158 X |
| 4,470,266 | 9/1984 | Briccetti et al. | 62/126 |
| 4,538,419 | 9/1985 | Lord | 62/129 |
| 4,688,389 | 8/1987 | Iida | 62/127 |

Primary Examiner—Harry B. Tanner
Attorney, Agent, or Firm—William J. Beres; William O'Driscoll

[57] ABSTRACT

A method of controlling the operation of an HVAC system comprising the steps of: accepting an input; selecting a first mode of operation if the input has a value in excess of a first predetermined limit; selecting a second mode of operation if the input has a value less than a second predetermined limit; selecting a third mode of operation if the input has a value which is between the second and the first predetermined limits.

17 Claims, 5 Drawing Sheets

FIG. 6

| | SPECIFIC VALUE | HP | GAS/ ELECTRIC |
|---|---|---|---|
| FAN ON (ITEM 124) | 2.2 K | SF ON | SF ON |
| ECONOMIZER | 3.3 K | OPEN, SF ON | OPEN, SF ON |
| COOL 1 | 4.7 K | C1, CFA+B ON<br>SF, RV ON | |
| COOL 2 | 6.8 K | C1, C2,<br>CFA+CFB<br>SF, RV ALL ON | |
| HEAT 1 | 10 K | C1, C2,<br>CFA+B ON,<br>SF ON | H1 ON, SF ON |
| HEAT 2 | 15 K | C1, C2, CFA+B,<br>H1 ON, SF ON | H1 + H2 ON<br>SF ON |
| HEAT 3 | 22 K | C1 + C2, CFA+B<br>H1 + H2 ON<br>SF ON | H1 + H2 ON<br>SF ON<br>GAS RV OFF<br>ELEC. RV ON |
| DEFROST | 33 K | SF ON<br>C1 + C2,<br>H1 + H2 ON<br>RV ON | N/A |
| EMERGENCY HEAT | 47 K | SF,<br>H1 + H2 ON | N/A |

(RV = REVERSING VALVE 12, SF = SUPPLY AIR FAN 70)

CONTROLLING HVAC TEST FUNCTIONS

BACKGROUND OF THE INVENTION

The present invention is directed to heating, ventilating and air conditioning systems, and more particularly, to improvements in heating, ventilating and air conditioning system testing.

Heating, ventilating and air conditioning (HVAC) systems have a number of possible system operating states, including heat pump, heat, cool, economizer, defrost, fan, and emergency heat. Each of these states can have several stages, such as might occur in a cooling system with more than one compressor, in a heating system with several heat stages, or in a heat pump system with auxiliary heat. Additionally each state can have variations depending upon the energy source used for air temperature control, i.e. electric, gas, or heat pump.

HVAC systems are tested by sequentially activating all relevant system states including each relevant stage, and all relevant variations. The subsequent operation of each state of the HVAC system is then observed for deviation from acceptable operation. The test capability in some previous systems provides an automatic, sequential activation of all possible refrigeration system states. Other systems provide a stepped, sequential activation of all possible refrigeration system states whenever an operator takes some positive action to tell the controller to move to the next state in the sequence. Still other systems allow an operator to manually select a single specific state for observation.

Each of these types of test capabilities has advantages and disadvantages. Manual test selection has the advantage that a sophisticated technician can initiate a particular test and observe the results without requiring the sophisticated technician to step through a sequence of states. The manual test has the disadvantage that an unsophisticated user may have neither the skill nor the knowledge to activate the operating mode, particularly where the system requires the use of a piece of equipment such as a resistor box to manually select an operating mode. Stepped test selection has the advantage that an unsophisticated user can operate the mode without the use of sophisticated equipment. Automatic test selection has the advantage that it need only be turned on, allowing a very unsophisticated user to monitor the operation of the refrigeration system. Automatic test selection has the disadvantage that the user cannot control the selection or timing of the sequence. Stepped and automatic test selection have the further disadvantage that a sophisticated user or technician may be frustrated at following the predetermined and mandatory sequence of states when the user or technician only desires to monitor one specific state.

SUMMARY OF THE INVENTION

It is an object of the invention to solve the problems of previous heating, ventilating and air conditioning test systems.

It is an object, feature and advantage of the present invention to provide automatic and stepped test modes of operation for a refrigeration system which can be initiated with a simple tool.

It is a further object and advantage of the present invention that the simple tool can actually be manufactured on site by an unsophisticated user.

It is a further object, feature and advantage of the present invention to allow a sophisticated technician to initiate a specific refrigeration state using a sophisticated tool.

It is a further option, feature and advantage of the present invention that the heating, ventilating and air conditioning system will return to normal operation if left in a test mode.

It is a further object, feature and advantage of the invention that a high level controller in a remote location can initiate and control the manual mode of operation.

It is a further object, feature and advantage of the present invention that the automatic test mode is initiated automatically if a short is applied on an input terminal for longer than a predetermined amount of time.

The present invention provides a method of controlling the operation of an HVAC system comprising the steps of: accepting an input; selecting a first mode of operation if the input has a value in excess of a first predetermined limit; selecting a second mode of operation if the input has a value less than a second predetermined limit; selecting a third mode of operation if the input has a value which is between the second and the first predetermined limits.

The present invention also provides an HVAC system controller comprising: first means for stepping through a sequence of system states; second means for automatically stepping through the sequence of system states; third means for selecting a specific system state without stepping through the sequence of system states; an input; and fourth means, responsive to the input, for selecting and initiating the operation of a particular one of the first, second, or third means.

The present invention also provides a method of selecting an HVAC system test mode of operation comprising the steps of: monitoring an input device to determine an input resistance; initiating a first mode of operation if the input resistance is extremely large; initiating a second test mode of operation if the input resistance is extremely small; initiating a third test mode of operation if the input resistance substantially matches one of a plurality of predetermined values.

The present invention further provides a method of testing the operation of an HVAC system comprising the steps of: connecting a jumper across a pair of input terminals for longer than a predetermined period of time to initiate an automatic test mode in an HVAC system controller; continually removing and replacing the jumper from the input terminals to step through a sequence of HVAC system states; and applying a specific resistance across the input terminals to initiate a specific test in the system controller.

The present invention further provides in combination, an HVAC system; a system controller including first means for controlling normal operation of the HVAC system, second means for controlling a stepped test mode of operation in the HVAC system, third means for controlling an automatic test mode of operation in the HVAC system, and fourth means for controlling a manual test mode of operation in the HVAC system; an analog input operably connected to the system controller; a device operably connected to the analog input for initiating a particular one of the second, third or fourth control means.

BRIEF DESCRIPTION OF THE DRAWINGS

FIG. 6 shows a table including the possible HVAC system states and their sequence as used in the preferred embodiment of the present invention.

DETAILED DESCRIPTION OF THE INVENTION

Figure 1:
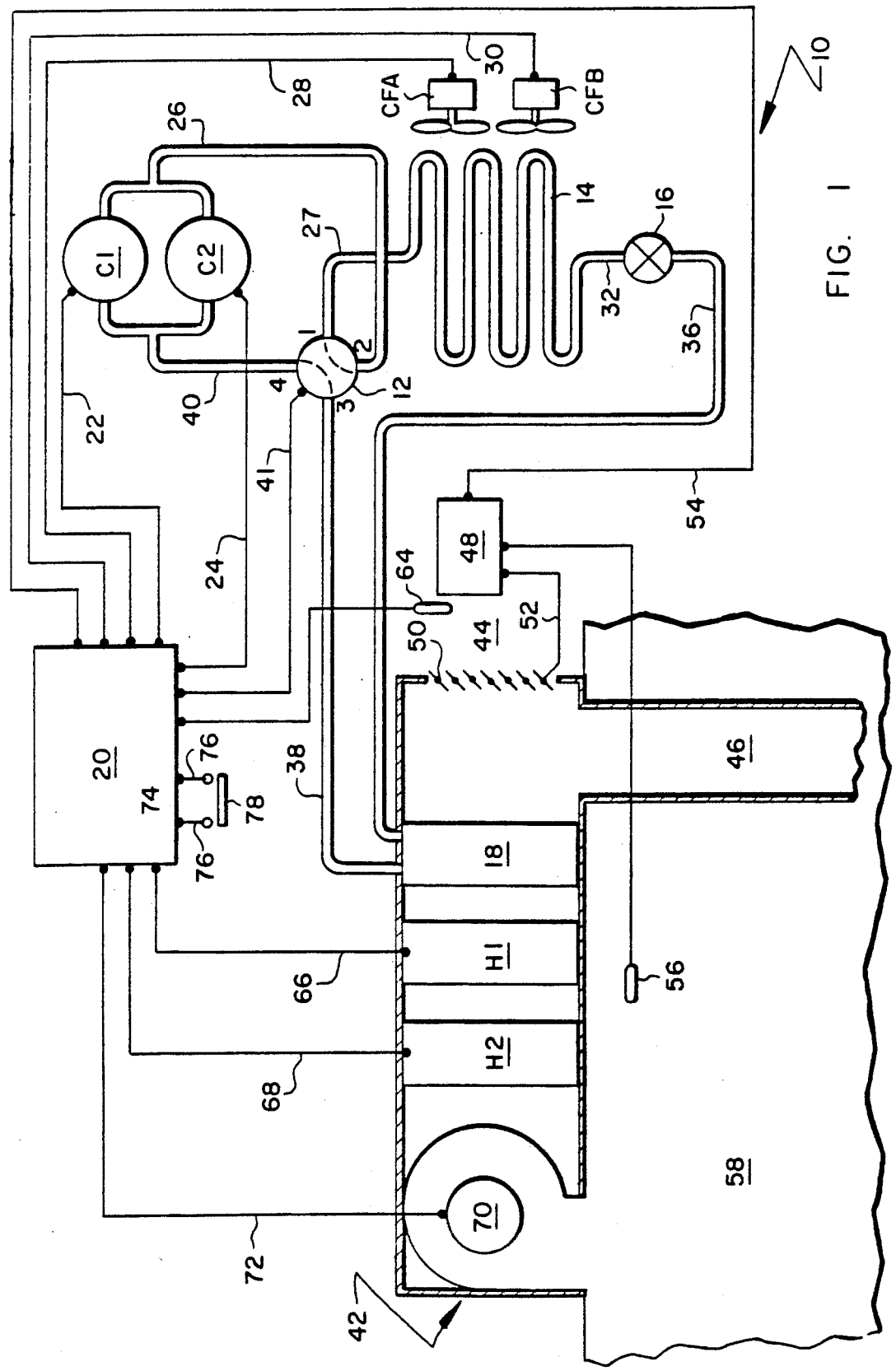
FIG. 1 shows a heating, ventilating and air conditioning system and a system controller including the test input of the present invention.

FIG. 1 shows an HVAC system 10 including a first compressor C1, a second compressor C2, a reversing valve 12, an outdoor heat exchanger 14, an expansion device such as an expansion valve 16, an indoor heat exchanger 18, and a system controller 20. The system controller includes a microprocessor (not shown) having both random access memory (RAM), and read only memory (ROM). The microprocessor of the preferred embodiment, a NEC series 7800, also includes real-time timers for use by application programs where the microprocessor will periodically decrement the timers until the timers are zero in value. If the invention is implemented on a microprocessor lacking such timers, the timers can be developed by using a system interrupt or flag whose interrupt rate is known.

The HVAC system shown in FIG. 1 is configured as a heat pump system with two compressors and two stages of auxiliary heat. However, the present invention is directed to selecting test modes of operation for HVAC systems, and the configuration of the actual HVAC system can vary considerably. For example, the HVAC system can be configured as a cooling only system.

In FIG. 1 the compressors C1 and C2 are connected in parallel and are selectively energized by the system controller 20 using electrical lines 22 and 24 respectively. A refrigerant line 26 leaving the compressors C1 and C2 is connected through ports 1 and 2 of the reversing valve 12 and a refrigerant line 27 to the outdoor heat exchanger 14 when the reversing valve 12 is in the cooling position as shown in the configuration of FIG. 1. The outdoor heat exchanger 14 is cooled by two condensing fans CFA and CFB, each of which is independently connected to and controlled by the system controller 20 using electrical lines 28 and 30 respectively. A refrigerant line 32 leaving the outdoor heat exchanger 14 is connected to the expansion valve 16. The expansion valve 16 is connected to the indoor heat exchanger 18 by a refrigerant line 36. A refrigerant line 38 from the indoor heat exchanger 18 is connected through ports 3 and 4 of the reversing valve 12 to the compressors C1 and C2 by means of a refrigerant line 40.

In the heating mode the system controller 20 controls the reversing valve 12 by means of an electrical line 41 so that the refrigerant line 26 leaving the compressors C1 and C2 is connected to the refrigerant line 38 and the indoor heat exchanger 18 through ports 2 and 3 of the reversing valve 12. The indoor heat exchanger 18 exchanges heat with the air passing over it, and cooled refrigerant leaves the indoor heat exchanger 18 passing along the refrigerant line 36 to the expansion valve 16. From the expansion valve 16 the refrigerant enters the outdoor heat exchanger 14 by means of the refrigerant line 32 where the refrigerant absorbs heat and vaporizes. The vaporized refrigerant returns to the compressors C1 and C2 through the refrigerant line 27, ports 1 and 4 of the reversing valve and the refrigerant line 40.

Figure 2:
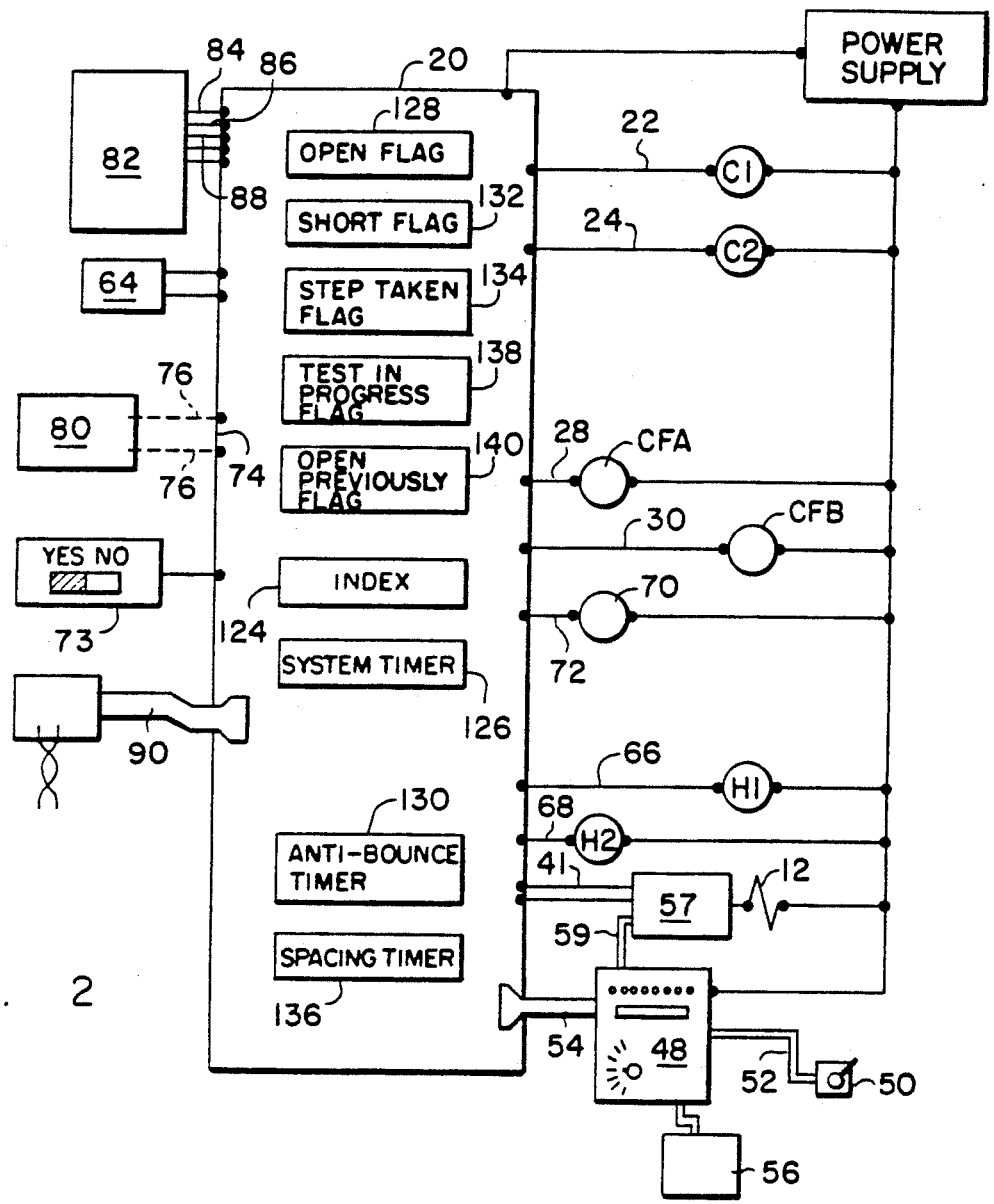
FIG. 2 shows the system controller including the test input of the present invention.

The HVAC system 10 also includes an air handling system 42 having an outside air connection 44 and a return air connection 46. An economizer 48 mixes the outside air and the return air using a damper 50 controlled by means of an electrical line 52. The economizer 48 is connected to the system controller 20 by an electrical connection 54 and includes at least a supply air temperature sensor 56 in a zone 58 so as to allow at least dry bulb economizing. Other sensors may be added to allow the use of more sophisticated economizer modes. The controller 10, as shown in FIG. 2, also includes a defrost controller 57 which is connected to the economizer 48 by a connecting line 59 if the economizer 48 is included in the HVAC system 10. The defrost controller is also located on the electrical line 41 between the controller 20 and the reversing valve 12 so that the defrost controller 57 can control the reversing valve 12 when defrosting. Additionally, the system controller 20 is connected to an outside air temperature sensor 64.

After the outside air and the return air have been mixed by the economizer 48, the air passes over the coils of the indoor heat exchanger 18. The mixed air then passes over a first auxiliary heater H1 and a second auxiliary heater H2, each of which are connected to the system controller 20 by electrical lines 66 and 68 respectively. Next, a supply air fan 70 impels the air into a space whose air is to be conditioned. The supply air fan 70 is operably connected to the controller 20 by means of an electrical line 72. The system controller 20 also includes an input 73 which provides an indication of whether the HVAC system 10 is configured for a heat pump or not.

The system controller 20 as shown in FIG. 2 includes a microprocessor, such as a NEC series 7800, having both read only memory (ROM) and random access memory (RAM). Although the controller 20 is shown as directly controlling its various components, an intermediate contactor is generally used.

FIGS. 1 and 2 show the system controller 20 including the test input 74 of the present invention and a pair of input terminals 76. In FIG. 1 a device for providing an electrical short, such as a jumper 78, is shown connected across the terminals 76 of the test input 74. The jumper can be, for example, a piece of wire, a pair of pliers, or an alligator clip. The jumper 78 is used to select automatic or stepped test modes of operation. In FIG. 2 a device which allows specified resistances to be selected, such as a resistor box 80, is shown connected across the terminals 76 of the test input 74. The resistor box 80 is used to select manual test modes of operation.

From FIG. 2 it can be seen that the inputs of the system controller 20 are from a zone sensor 82 which provides a zone temperature setpoint from the zone 58, a cooling setpoint and a heating setpoint to the system controller 20 by means of respective electrical lines 84, 86, 88; an outdoor temperature input 64; the test input 74; a communications connection 90 to a building control system (not shown); and the economizer connection 54. The system controller 20 also includes outputs which include the building control system connection 90 and the economizer connection 54 as well as the electrical connections 22, 24, 28, 30, 66, 68, 41, 72 to the compressors C1 and C2, the condenser fans CFA and CFB, the heaters H1 and H2, the reversing valve 12, and the supply air fan 70 respectively. The microprocessor of the system controller 20 includes several flags: an open flag 128, a short flag 132, a step taken flag 134, a test in progress flag 138 and an open previously flag 140. The microprocessor also includes several timers which the microprocessor periodically decrements until they are at zero including a system timer 126, an anti-bounce timer 180, and a spacing timer 136.

Figure 3:
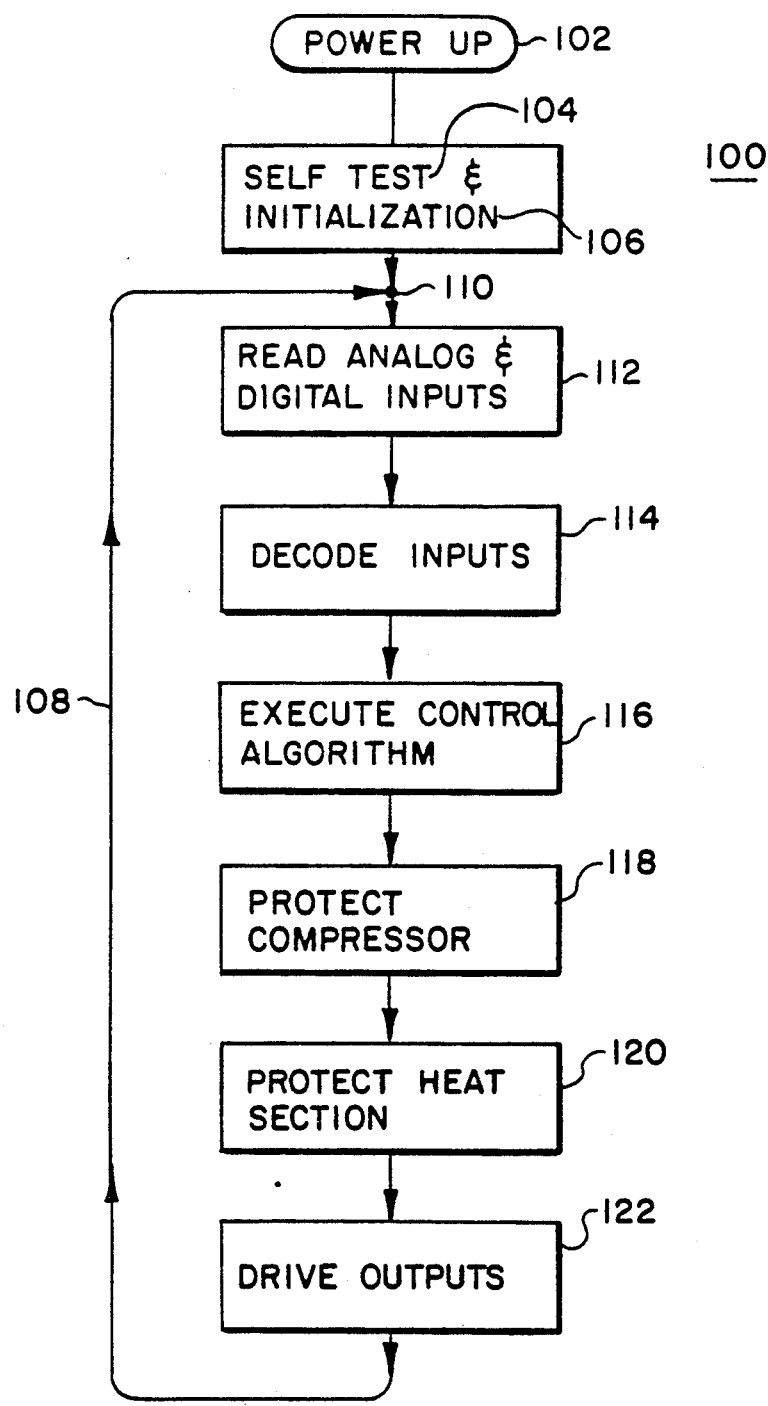
FIG. 3 shows a flow chart of the general operation of the system controller of FIG. 2.

FIG. 3 shows an operational overview 100 of the system controller 20. After power up 102 the controller 20 goes through a self test 104 and an initialization 106. The system controller 20 then enters a perpetual loop 108 starting at point 110. In the loop 108 the controller 20 first reads all analog and digital inputs 112, and then decodes those inputs at step 114. In the process of decoding the inputs, the controller 20 determines the system configuration including whether the HVAC system 10 is configured as a heat pump or cooling only system. After the inputs are decoded, the system controller 20 executes a control algorithm 116 which, dependent upon the inputs and the system configuration, takes whatever action is necessary to heat or cool the zone 58 using the HVAC system 10. After executing the control algorithm, the compressor 118 and the heat sections 120 are protected, and output drivers 122 are used to implement decisions made while in the loop 108. The loop 108 is then re-entered at point 110.

The system controller 20 has a normal mode of operation and also has three test modes of operation: manual, stepped and automatic. When the controller 20 is in the normal mode of operation the inputs to the controller 20 are decoded and evaluated to determine if cooling or heating should be implemented, and the controller 20 implements the appropriate system state of the table of FIG. 6. When in the test modes of operation an index 124 in a specific RAM location in the controller 20 is set to point to the appropriate system state in the table of FIG. 6. The index 124 is set to NUL when in the normal mode of operation.

In the manual test mode of the system controller 20, a specific analog resistance is entered at the terminals 76 of the test input 74. The specific analog input can be entered using the resistor box 80 as is shown in FIG. 2, or by connecting a resistor of the appropriate value (not shown) as a jumper across the terminals 76 of the test input 74. Other ways of entering specific values are also contemplated. The resistance across the terminals 76 is read as a specific analog value at the test input 74. The system controller 20 reads the specific analog value from the test input 74 and compares the specific analog value to the resistance values in column 2 of the table of FIG. 6 to identify a desired system state. When a match is found, the index 124 to the table of FIG. 6 is set accordingly so that the control algorithm will bypass the normal mode of operation and implement the desired system state. The resistance values used in column 2 of the table of FIG. 6 to identify the desired system states were arbitrarily selected to correspond to standard readily available resistors and can readily be varied to meet various requirements. In the preferred embodiment the system controller 20 includes a 10% tolerance in reading the resistance values to compensate for the varying accuracies of standard resistors. However, although the preferred embodiment identifies desired system states by identifying predetermined resistances to within a predetermined tolerance, the invention is not intended to be limited to identifying specified resistances to within a predetermined tolerance, and in fact, could easily be implemented using ranges of resistance or some other method. Of more importance is the correspondence of a specific resistance across the input terminals 76 to a specific system state.

For example, if a resistor having a resistance of approximately 22,000 ohms is placed across the input terminals 76, the resistance value is compared to column 2 of the table of FIG. 6 and found to indicate that the HEAT 3 state is desired. The index 124 is set to point to HEAT 3 in the table of FIG. 6. If the HVAC system 10 is configured as a heat pump, the control algorithm then places the HVAC system 10 in the HEAT 3 state by turning on the compressors C1 and C2, the condenser fans CFA and CFB, the auxiliary heaters H1 and H2, and the supply fan 70. The HVAC system 10 will remain in selected system state until the system timer 126 expires. The system timer 126 is set to approximately 60 minutes in the preferred embodiment each time the index 124 is altered.

In the stepped test mode of the system controller 20, a device for providing an electrical short, such as a jumper 78, is connected to the test input 74 for a predetermined minimum time period. The minimum time is determined by the anti-bounce timer 130, is two seconds in the preferred embodiment and serves an anti-bounce function. The jumper 78, as shown in FIG. 1, can be a piece of electrical wiring, an alligator clip or any other conductive object which can create an electrical short across the test input terminals 76. The system controller 20 reacts to an electrical short at the test input 74 by incrementing the index 124 by one and initiating whichever system state the index 124 points to. Each time the jumper 78 is removed and reconnected to the test inputs 76, the index 124 is incremented. This allows a technician to step through the states of the HVAC system 10 and observe each state in operation.

For example, if the index 124 is initially NUL, indicating that the HVAC system 10 is operating normally, the connection of a jumper 78 at the test input 74 will cause the index 124 to point to the first entry in the table of FIG. 6, i.e. FAN ON. Assuming a heat pump system, the supply fan 70 will be turned on. If the jumper 78 is removed and then reconnected to the test input 74, the index 124 will increase by one. The system controller 20 will then execute the ECONOMIZER state where the outside air economizer damper 50 is fully opened and the supply fan 70 turned on. If the jumper 78 is removed and applied again the COOL 1 state is initiated. In COOL 1, the compressor C1, the condenser fan CFA and CFB, the supply fan 70 and the reversing valve 12 are all turned on. Each time the jumper 78 is removed and reconnected, the index 124 incremented, the elements of the HVAC system 10 which are both listed in column 3 of the table of FIG. 6 and pointed to by the index 124 are turned on, and the remaining elements in the HVAC system 10 are turned off. When the final entry is reached, the reapplication of the jumper 78 returns the HVAC 10 to the normal mode of operation. If the jumper 78 is applied again, the index 124 returns to the first entry, FAN ON, and continues down the table of FIG. 6. If the jumper 78 is removed and not reapplied while in a test mode of operation, the test mode of operation will remain in the selected system state until the system timer 126 expires. In the preferred embodiment the system timer 126 will expire after approximately 60 minutes.

The automatic test mode of the system controller 20 is similar to the stepped mode in that it is initiated by an electrical short across the test input terminals 76. The electrical short can be initiated by the same device used to initiate the stepped test mode, such as the jumper 78 shown in FIG. 1. In fact, if the device used to initiate an electrical short, such as the jumper 78, is not removed from the test input 74 within a predetermined time period, the HVAC system 10 initiates the automatic test mode.

In the automatic test mode the controller 20 sequentially steps through the possible states of the HVAC system 10, remaining in each state for a specified time period. In the preferred embodiment this specified time period is approximately 30 seconds. Thus an observer can initiate the automatic mode using a jumper 78 across the test input terminals 76 and then observe the HVAC system 10 cycle through the various system states.

For example, if the HVAC system 10 is configured as a gas or electric system and is operating in the normal mode of operation, the application of a jumper 78 to the test input terminals 76 will initiate the FAN ON state. Initially, the HVAC system 10 will be in the stepped test mode of operation. If the jumper 78 is left connected to the input terminals 76 for a time period of more than 30 seconds as determined by the spacing timer 136, the system controller 20 will initiate the automatic test mode of operation. If the index 124 was pointing to the FAN ON state, the index 124 will be incremented to point to the ECONOMIZER state. The system controller 20 will then run the ECONOMIZER state with the outside air damper 50 wide open and the supply fan 70 on. After another thirty seconds the index 124 will be incremented automatically to point to the COOL 1 state if the jumper 78 is still connected to the input terminals 76. If the jumper 78 is still connected after an additional thirty second time period, the COOL 1 state will be then initiated where the damper 50 is closed, and the compressor C1, the condenser fans CFA and CFB, the supply fan 70 and the reversing valve 12 are turned on. If the jumper 78 is removed while in the auto test mode of operation, the HVAC system 10 will revert to the stepped test mode of operation until the system timer expires. This system timer is set in the preferred embodiment to a time period of sixty minutes each time the index 124 is altered. In the preferred embodiment, the automatic test mode of operation steps through each state of the table of FIG. 6 once, then returns the HVAC system 10 to normal operation. Alternatively, the HVAC system 10 can continually cycle through the states of the table of FIG. 6, spending approximately thirty seconds on each system state until the system timer 126 expires.

Figure 4:
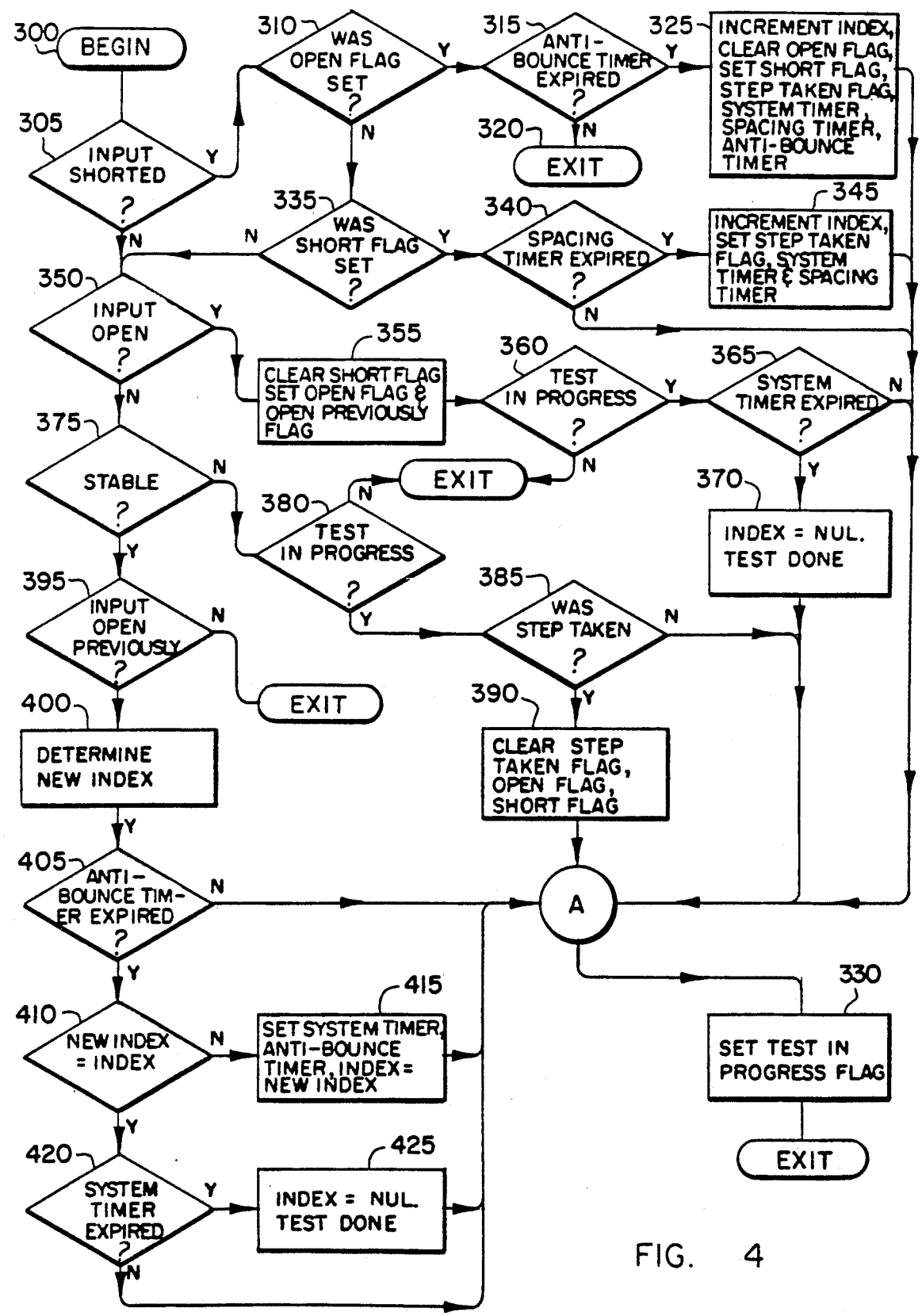
FIG. 4 shows an operational flow chart of the present invention.

FIG. 4 shows an operational flow chart of the present invention which begins at step 300. The flow chart shown in FIG. 4 forms a part of the decode input step 114 shown in FIG. 3.

At step 305 a determination is made whether the test input 74 has been electrically shorted. If the test input 74 is electrically shorted, then either the automatic test mode or the stepped test mode is desired. If the test input 74 is shorted, then at step 310 a check of the open flag 128 is made to determine if the electrical short is a pre-existing condition or a change of state. If the electrical short was a change of state then the anti-bounce timer 130 is checked at step 315 to see if a predetermined time period, two seconds in the preferred embodiment, has expired. If not, the operational flow chart is exited at step 320. If the anti-bounce timer 130 has expired, at step 325 the index 124 is incremented, the open flag 128 is cleared, the short flag 132 is set and the step taken flag 134 is set. Additionally the system timer 126 is set, the spacing timer 136 is set to a 30 second time period, and the anti-bounce timer 126 is set. The test in progress flag 138 is set at step 330 and the operational flow chart is exited. The 30 second time period can be varied to meet the needs of various system configurations and requirements.

If a change of state cannot be verified at step 310, the short flag 132 is checked at step 335. If an electrical short previously existed, the spacing timer 136 is checked at step 340 to determine whether or not the automatic test mode of operation should be initiated. If the electrical short has existed for at least 30 seconds, the automatic test mode is initiated. When the automatic test mode is initiated, the index 124 is incremented at step 345 and the step taken flag 134 is set. Additionally the system timer 126 and the spacing timer 136 are set. Whatever the result of step 340 the test in progress flag 138 is set at step 330 and the operational flow chart exited.

If an electrical short did not exist at step 305, or if an ambiguous result was reached at step 335, then a check for an open condition across the input terminals 76 is made at step 350. An open condition in the preferred embodiment generally indicates the normal mode of operation for the refrigeration system, although a previously initiated test mode of operation could be operational. If the connection across the input terminals 76 is open, then the short flag 132 is cleared, and the open flag 128 and the open previously flag 140 is set to indicate that the HVAC system 10 did not start with a connection across the input terminals 76. Next at step 360, a check of the test in progress flag 138 is made to see if a test is in progress. If not, the operational flow chart is exited and the normal mode of operation is implemented. However, if a test is in progress, the system timer 126 is allowed to expire at step 365 before the HVAC system 10 is reset to normal operation at step 370. This is because an open condition at the input terminals 76 can exist under conditions when a jumper 78 was applied, a test mode initiated, and the jumper 78 then removed to preclude the initiation of the automatic test mode of operation. In this eventuality the particular test mode of operation selected will run for approximately one hour until the system timer 126 expires.

If the checks made at steps 305, 335, and 350 determine that a connection exists across the input terminals 76 which is neither opened nor closed, then step 375 is initiated. In this situation a specific resistance may have been applied across the input terminals 76 to indicate that the manual test mode of operation is desired and that a specific system state is being requested. First, however, several checks are made. At step 375 the input 74 is checked for stability. If the input 74 is not stable and step 380 shows that a test is not in progress, then the operational flow chart is exited. If the input 74 is not stable and a test is in progress, then a check of the step taken flag 134 is made at step 385 to see if a step has been taken. If a step has been taken then the step taken flag 134, the open flag 128, and the short flag 132 are all cleared and the operational flow chart is exited after setting the test in progress flag 138.

If the test input 74 at step 375 is stable, a further check is made at step 395 to see if the open previously flag 140 has been set. If the open previously flag 140 is not set, then the operational flow chart is exited because the HVAC system 10 probably started with a resistance from a previous test still operably connected across the input terminals 76. If the input 74 was open previously, this condition does not exist and the manual test mode is being requested. Consequently at step 400 a new index is determined by comparing the resistance across the input terminals 76 with the range of values shown in column 2 of the table of FIG. 6. When a match is found, the new index is set accordingly. The anti-bounce timer 130 is checked at step 405 to protect against situations where a technician is progressively moving up a resistance scale and consequently changing resistances very quickly. If the anti-bounce timer 130 is expired, a check is made at step 410 to see if the new index equals the existing index 124 to determine if the selected system state is already running. If there is no match then a new system state is desired and initiated at step 415. At step 415 the system timer 126 and the anti-bounce timer 130 are set, and the index 124 set equal to the new index. The test in progress flag 138 is set and the operational flow chart is exited. If the new and the existing indices were the same at step 410, then the system timer 126 is checked for expiration at step 420 and the HVAC system 10 set for normal operation at step 425 if the system timer 126 has expired.

Figure 5:
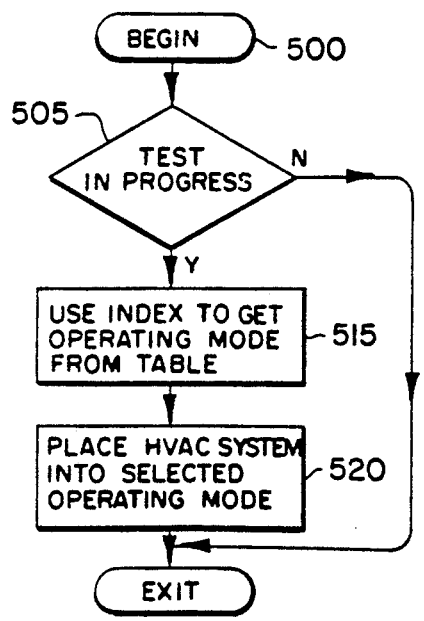
FIG. 5 shows an operational flow chart of the present invention showing a portion of the execute control algorithm of FIG. 3.

Once the algorithm shown in FIG. 4 has determined the HVAC system's mode of operation and system state, the control algorithm portion 116 of FIG. 3 is entered. This is shown in more detail in FIG. 5 commencing at step 500. At step 505 the test in progress flag 138 is checked and normal operation is continued if the test in progress flag 138 is not set. However, if the test in progress flag 138 is set, then the index 124 is accessed and used to determine the desired operating mode and system state. Finally at step 520 the HVAC system 10 is placed in the desired system state so that an observer may observe the HVAC system 10.

Thus the invention has been described in terms of a method and apparatus for selecting test modes of operation for an HVAC system 10. The invention allows an unsophisticated operator to use a simple jumper 78 to step through the various possible states of the HVAC system 10, or to place the HVAC system 10 in an automatic test mode of operation. The invention also allows a more sophisticated user or technician to select a specific system state by means of a device such as a resistor box 80 and thereby bypass the stepped mode of operation provided for the use of unsophisticated users.

In a broader sense, the HVAC system operates in a first mode of operation if an extremely large resistance, such as an open, is detected across the input terminals, in a second mode of operation if an extremely small resistance, such as a short, is detected across the input terminals, and in a third mode of operation if a specific resistance value is across the input terminals.

Although the present invention is described in connection with the preferred embodiment above, it is apparent that many alterations and modifications are possible without departing from the concept of the present invention. Such alterations and modifications could involve reversing the "short" and "open" inputs so that the system operates normally when the jumper is in place to short across the input terminals, and enters the stepped or automatic test modes of operation when the input is opened. Additionally, the open, short, and specific resistance values used to respectively indicate normal operation, stepped or automatic test operation, and manual test operation could be replaced by predetermined corresponding voltage or current inputs, recognizing that such a modification would certainly add expense and complexity to the HVAC system. Similar modifications or alterations are also possible. It is intended that all such alterations and modifications be considered within the scope and spirit of the invention as defined in the following claims.

What is claimed and desired to be secured by Letters Patent of the United States is:

1. A method of controlling the operation of a refrigeration system comprising the steps of:
   accepting an input;
   operating the refrigeration system normally if the input has a value in excess of a first predetermined limit;
   operating the refrigeration system in a stepped test mode if the input has a value less than a second predetermined limit;
   operating the refrigeration system in a manual test mode if the input has a value which is between the second and the first predetermined limits.

2. The method of claim 1 including the further step of operating the refrigeration system in an automatic test mode if the input has a value less than the second predetermined limit and the input is applied for more than a predetermined time period.

3. The method of claim 1 wherein the input is an analog input.

4. The method of claim 1 wherein the first predetermined limit is a value substantially equivalent to an electrically open connection and the second predetermined limit is a value substantially equivalent to an electrically shorted connection.

5. The method of claim 1 wherein the first predetermined limit is a value substantially equivalent to an electrically shorted connection and the second predetermined limit is a value substantially equivalent to an electrically open connection.

6. A method of controlling the operation of a refrigeration system comprising the steps of:
   accepting an input;
   operating the refrigeration system in a stepped test mode if the input has a value in excess of a first predetermined limit,
   operating the refrigeration system normally if the input has a value less than a second predetermined limit,
   operating the refrigeration system in a manual test mode if the input has a value which is between the second and the first predetermined limits,
   operating the refrigeration system in an automatic test mode if the input has a value less than the first predetermined limit and the input is applied for more than a predetermined time period.

7. A method of controlling the operation of a refrigeration system comprising the steps of:
   accepting an input including determining whether a pair of electrical terminals is open, is electrically shorted by a jumper, or is connected by a specific resistance;
   selecting a first mode of operation if the input has a value in excess of a first predetermined limit;

selecting a second mode of operation if the input has a value less than a second predetermined limit;

selecting a third mode of operation if the input has a value which is between the second and the first predetermined limits.

8. An HVAC system controller comprising:

first means for stepping through a sequence of system states;

second means for automatically stepping through the sequence of system states;

third means for selecting a specific system state without stepping through the sequence of system states;

an input; and fourth means, responsive to said input, for selecting and initiating the operation one of said first, second, or third means.

9. The controller of claim 8 wherein the input is an analog input, and the fourth means further includes means for determining whether the analog input is shorted, opened, or equivalent to a specific value.

10. A method of selecting an HVAC system test mode of operation comprising the steps of:

monitoring an input device to determine an input resistance;

initiating a first mode of operation if the input resistance is extremely large;

initiating a second mode of operation if the input resistance is extremely small;

initiating a third mode of operation if the input resistance substantially matches one of a plurality of predetermined values.

11. The method of claim 10 including the further step of initiating a fourth mode of operation if the input resistance is extremely large and is continuous for longer than a predetermined period of time.

12. The method of claim 10 including the further step of initiating a fourth mode of operation if the input resistance is extremely small and is continuous for longer than a predetermined period of time.

13. The method of claim 10 wherein the extremely large resistance is an open and the extremely small resistance is a short.

14. A method of testing the operation of an HVAC system comprising the steps of:

connecting a jumper across a pair of input terminals for longer than a predetermined period of time to initiate an automatic test mode in an HVAC system controller;

continually removing and replacing the jumper from the input terminals to step through a sequence of an HVAC system states; and applying a specific resistance across the input terminals to initiate a specific test in the system controller.

15. In combination, an HVAC system; a system controller including first means for controlling normal operation of the HVAC system, second means for controlling a stepped test mode of operation in the HVAC system, third means for controlling an automatic test mode of operation in the HVAC system, and fourth means for controlling a manual test mode of operation in the HVAC system; an analog input operably connected to the system controller; a device operably connected to the analog input for initiating a particular one of the second, third or fourth control means.

16. The combination of claim 15 wherein the device includes means for providing an electrical short.

17. The combination of claim 15 wherein the device includes means for providing a specific electrical resistance.

* * * * *